US008630880B2

(12) United States Patent
Munger

(10) Patent No.: US 8,630,880 B2
(45) Date of Patent: Jan. 14, 2014

(54) SYSTEM AND METHOD FOR INSURANCE PREMIUM CALCULATON USING COMMODITY PRICES

(71) Applicant: Hartford Fire Insurance Company, Hartford, CT (US)

(72) Inventor: Nicholas Ryan Munger, Newington, CT (US)

(73) Assignee: Hartford Fire Insurance Company, Hartford, CT (US)

(\*) Notice: Subject to any disclaimer, the term of this patent is extended or adjusted under 35 U.S.C. 154(b) by 0 days.

(21) Appl. No.: 13/716,543

(22) Filed: Dec. 17, 2012

(65) Prior Publication Data

US 2013/0110559 A1     May 2, 2013

Related U.S. Application Data

(63) Continuation of application No. 12/904,296, filed on Oct. 14, 2010, now Pat. No. 8,364,506.

(51) Int. Cl.
*G06Q 40/00* (2012.01)
(52) U.S. Cl.
USPC ............................................................ 705/4

(58) Field of Classification Search
CPC ........ G06Q 40/08; G06Q 40/02; G06Q 10/10
USPC ............................................................ 705/4
See application file for complete search history.

(56) References Cited

U.S. PATENT DOCUMENTS

| | | | |
|---|---|---|---|
| 5,202,827 A | 4/1993 | Sober | |
| 7,386,463 B2 | 6/2008 | McCabe | |
| 7,752,126 B2 | 7/2010 | Wang | |
| 2005/0027572 A1 | 2/2005 | Goshert | |
| 2007/0050275 A1\* | 3/2007 | Hunsicker | 705/35 |
| 2007/0162367 A1 | 7/2007 | Smith et al. | |
| 2009/0132298 A1\* | 5/2009 | Benward et al. | 705/4 |
| 2010/0042442 A1\* | 2/2010 | Seitomer et al. | 705/4 |
| 2010/0185554 A1 | 7/2010 | Sivasundaram et al. | |

\* cited by examiner

*Primary Examiner* — Clifford Madamba
(74) *Attorney, Agent, or Firm* — Howard IP Law Group, PC

(57) ABSTRACT

Risk characteristic information is received concerning a property that is to be insured by an insurance company. The risk characteristic indicates sensitivities of the property to commodity prices. Commodity futures information is also received. The commodity futures information indicates futures contract prices for at least one commodity. An insurance pricing model is stored. The insurance pricing model operates to base pricing of insurance policies at least in part on the commodity futures information. A premium quotation for insuring the property is generated based at least in part on the insurance pricing model and the commodity futures information.

22 Claims, 14 Drawing Sheets

SYSTEM AND METHOD FOR INSURANCE PREMIUM CALCULATON USING COMMODITY PRICES

CROSS REFERENCE TO RELATED APPLICATION

This present application is a continuation of co-pending prior U.S. patent application Ser. No. 12,904,296, entitled "SYSTEM AND METHOD FOR MANAGING DERIVATIVE MARKET INSURANCE TRANSACTIONS" and filed on Oct. 14, 2010. The entire contents of that application are incorporated herein by reference.

FIELD

The present invention relates to computer systems used in connection with insurance operations.

BACKGROUND

One significant factor in setting insurance premium rates is the expected severity of losses, i.e., the anticipated costs of resolving claims. It is known to consider predicted rates of inflation of overall price levels in attempting to estimate future claim severity, but experience has shown that such estimates may tend to be inaccurate. This is because overall inflation trends are not necessarily indicative of changes in the costs of settling claims.

The present inventor has recognized that one way to approach this problem is by referring to pricing in certain derivatives markets. More specifically, the inventor has recognized that pricing of commodities futures contracts may provide the type of forward-looking insurance premium pricing guidance that overall inflation rates fail to adequately provide.

SUMMARY

An apparatus, method, computer system and computer-readable data storage medium are disclosed which include a risk information component that inputs risk characteristic information. The risk characteristic information relates to a property to be insured (such as a building or motor vehicle) and indicates sensitivities of the property to commodity prices.

The apparatus, method, computer system and computer-readable data storage medium further includes a commodity futures information input component that receives commodity futures information, where the commodity futures information indicates futures contract prices for at least one commodity.

Still further, the apparatus, method, computer system and computer-readable data storage medium includes a pricing model component. The pricing model component stores an insurance pricing model, which operates to base the pricing of insurance policies at least partly on the commodity futures information received by the commodity futures information input component.

In addition, the apparatus, method, computer system and computer-readable data storage medium includes a processor that operates with the risk information input component, the commodity futures information input component and the pricing model component. The processor applies the insurance pricing model to the risk characteristic information and to the commodity futures information and generates a premium quotation for insuring the particular risk. The premium quotation is based at least partly on the insurance pricing model and the commodity futures information.

The apparatus, method, computer system and computer-readable data storage medium also includes an output module that outputs the premium quotation.

With these methods and systems, it may be possible to make more accurate estimates of the future severity of claims with respect to particular types of properties to be insured, and to more accurately align premiums charged by the insurance company with the probable losses that the insurance company may incur.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 3 is a block diagram that illustrates a server computer that is a component of the computer system of FIG. 2.

DETAILED DESCRIPTION

In general, and for the purposes of introducing concepts of embodiments of the present invention, a model for pricing insurance policies takes in one or more commodity futures prices as an additional input in calculating the expected severity of potential claims with respect to the particular property to be insured. The commodity futures price(s) may relate to one or more materials that would be used to repair or replace the insured property, such as a futures price for a commodity that is used in manufacturing some or all of a structure or other item to be insured. By using the commodity futures price as an input to the pricing model, the resulting insurance premium quotation may provide improved accuracy in reflecting the potential cost of insuring the property.

Figure 1:
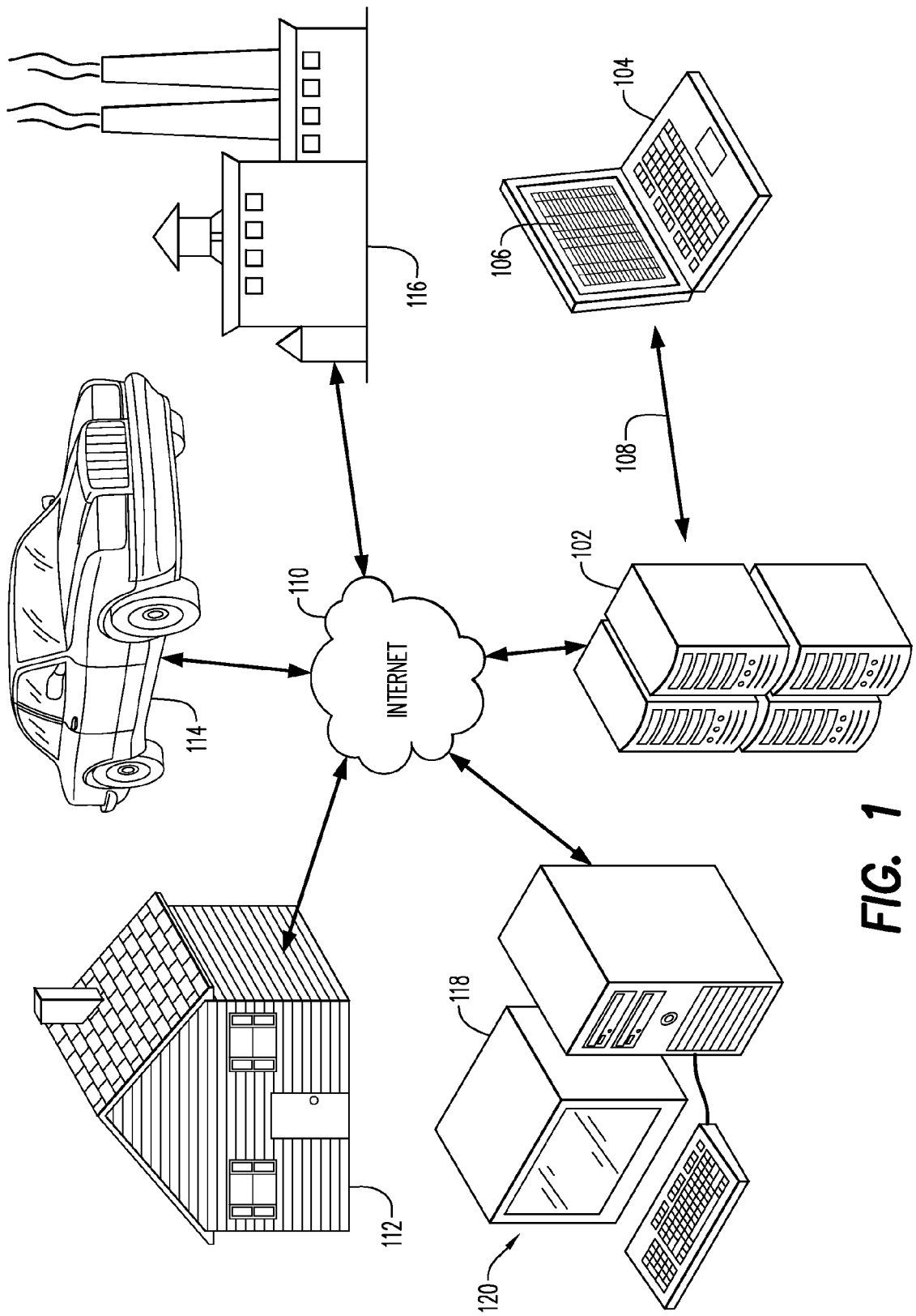
FIG. 1 schematically illustrates a business environment in which the present invention may be applied.

FIG. 1 schematically illustrates a business environment in which the present invention may be applied.

FIG. 1 schematically shows aspects of an insurance business. As is customary, the insurance company in question operates one or more central computers, including server computer 102 shown in FIG. 1. Other computers deployed in the insurance company may include personal/notebook computers assigned to individual employees, including the computer indicated by reference numeral 104. One function that may be performed by the computer 104 is displaying report data 106 that has been downloaded to the computer 104 from the server computer 102 via a communication path 108.

The server computer 102 may also exchange information with other parties, including for example holders of insurance policies issued by the insurance company. This exchange of information may occur via private and/or public data communication networks, including the Internet (reference numeral 110). Such policy holders may include owners of residential properties 112 that are covered under homeowner's insurance policies; owners of motor vehicles 114 that are covered by motor vehicle liability and/or property damage policies; and large commercial/industrial enterprises, such as the corporate owner of a factory 116. Policies written by the insurance company may cover property damage to motor vehicles or structures, including the buildings shown in FIG. 1, and other types of structures as well, such as office buildings and/or retail space.

Still further, the insurance company may have contractual relationships with numerous independent insurance agencies that place and provide services for policies written by the insurance company. Thus the server computer 102 may engage in data communication with computers 118 operated by the company's agents. As indicated at 120, the insurance agent computer 118 includes a screen display by which the agent can view information downloaded to the insurance agent computer 118 from the insurance company server computer 102.

Figure 2:
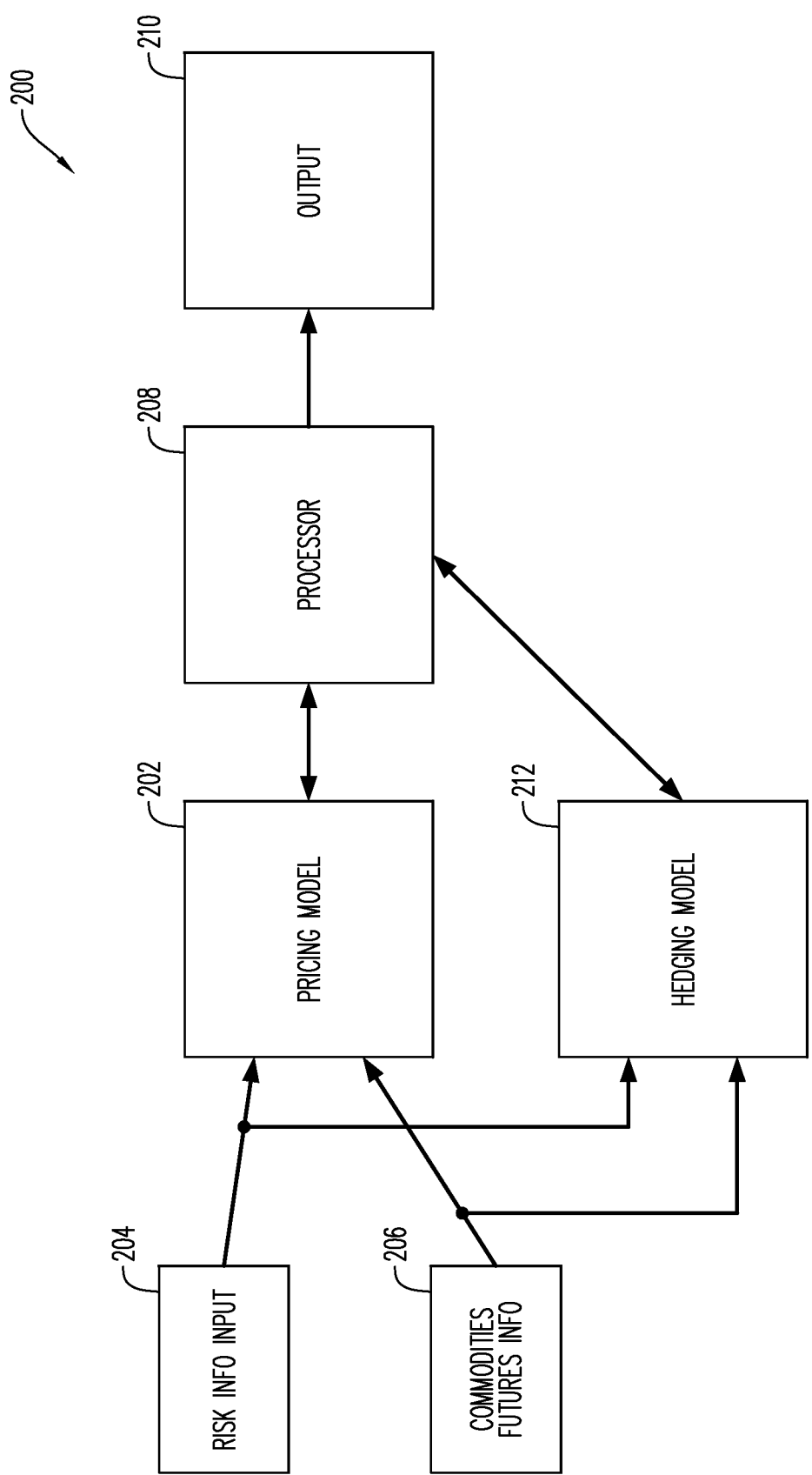
FIG. 2 is a block diagram that illustrates a computer system provided in accordance with aspects of the present invention.

FIG. 2 is a block diagram that illustrates a computer system 200 provided in accordance with aspects of the present invention.

Block 202 in FIG. 2 represents a pricing model component that is part of the computer system 200. The pricing model component 202 stores an insurance pricing model (not separately shown), which can be used to generate an insurance premium quotation based on at least one commodity price and based on a property's exposure or sensitivity to the commodity price.

Block 204 in FIG. 2 represents another component of the computer system 200, namely a risk information input component that is a source of information concerning a property that is proposed to be insured. In particular, the risk information input component 204 is a source or mechanism for inputting to the pricing model component 202 information that indicates sensitivities of the property to commodity prices. The risk information input component 204 may also be a source or mechanism for inputting other information about the property. (As used herein and the appended claims, the term "property" includes a structure or physical object such as a motor vehicle for which it is proposed to issue property damage insurance.)

A commodity futures information input component 206 is also shown in FIG. 2 as another component of the computer system 200. The commodity futures information input component 206 is another input to the pricing model component 202 and may, for example, be implemented as a feed of current prices of commodity futures contracts as executed on one or more commodity futures markets and/or exchanges.

Block 208 in FIG. 2 represents a processor that is part of the computer system 200. The processor 208 is coupled to the pricing model component 202, the risk information input component 204 and the commodity futures information input component 206. The processor 208 operates to apply the pricing model stored in the pricing model component 202 to the risk information provided by the risk characteristic information input component 204 and to the commodity futures information provided by the commodity futures information input component 206. The result of the application of the pricing model to these inputs is a premium quotation for the proposed insurance coverage, reflecting the pricing model and the commodity futures information.

Another component of the computer system 200 is an output module 210 that is coupled to the processor 208. The output module 210 may operate under the control of the processor 208 and may output the premium quotation generated by the processor 208 for viewing by a user of the computer system 200. For example, the output module 210 may display the premium quotation on a display component (not separately shown in FIG. 2) and/or may print out the premium quotation.

Still another component of the computer system 200 is a hedging model component represented by block 212 in FIG. 2. The hedging model component 212 stores a hedging model (not separately shown) that may be applied by the processor 208 to determine one or more commodity transactions for hedging the insurance company's exposure to property damage risks that are sensitive to one or more commodity prices.

The risk information input component 204 and the commodity futures information input component 206 may both supply inputs to the hedging model component 212. The input(s) supplied to the hedging model component 212 from the commodity futures information input component 206 may include commodity price information for at least one commodity. The risk information input component 204 may provide information that summarizes an aggregation of properties insured or projected to be insured by the insurance company.

The processor 208 is coupled to the hedging model component 212. By applying the hedging model stored in the hedging model component 212, the processor 208 may generate one or more hedging transaction orders that would execute one or more commodity transactions as determined according to the hedging model. The purpose and/or function and/or effect of the commodity transactions may be to hedge the insurance company's exposure to changes in commodity prices arising from the insurance company's issuance of insurance coverage on one or more classes of insured properties.

The output module 210 may output the hedging transaction orders generated by the processor 208. For example, the output module may communicate the hedging transaction orders to a broker or a commodity futures trading market so that the hedging transaction orders are executed.

Figure 3:
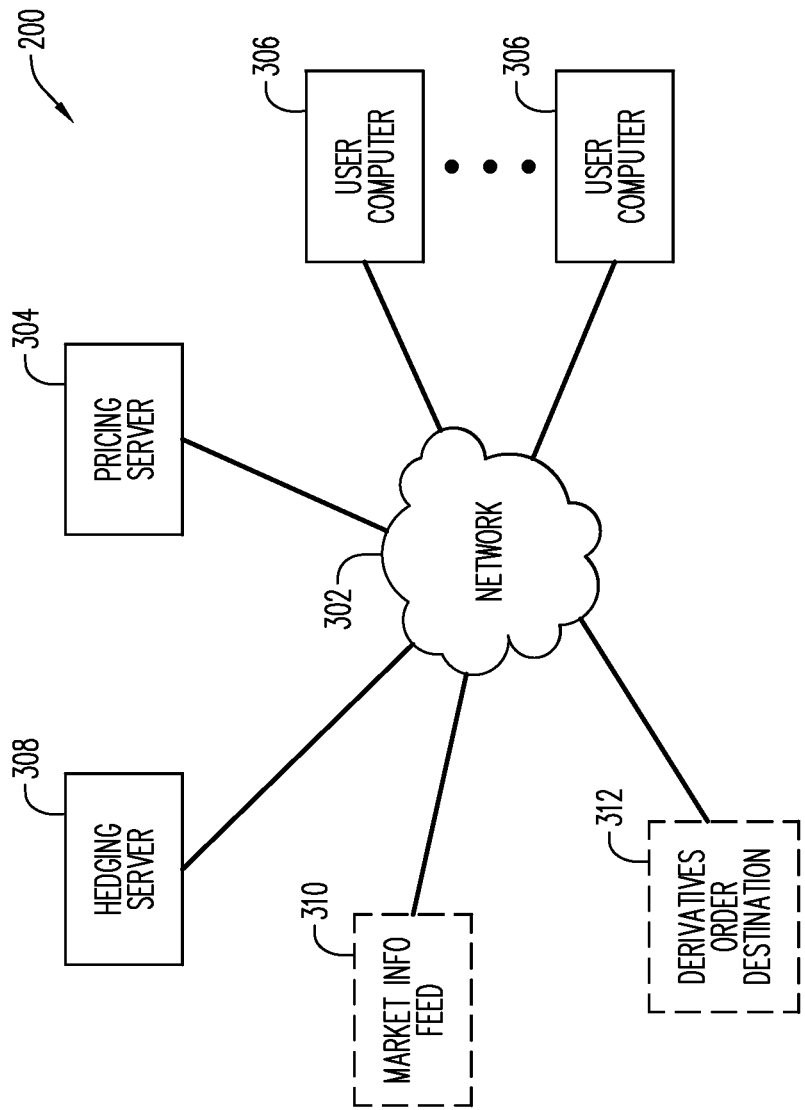
FIG. 3 is an alternative block diagram illustration of a computer system provided in accordance with aspects of the present invention.

FIG. 3 is an alternative block diagram representation of the computer system 200.

Reference numeral 302 in FIG. 3 represents the Internet or other public or private data communications network. Block 304 represents an insurance policy pricing server computer that is operated by the insurance company and is coupled to the data communication network 302. The insurance policy pricing server 304 may incorporate the pricing model that was mentioned above in connection with FIG. 2, and may operate in accordance with aspects of the present invention.

The computer system 200, as depicted in FIG. 3, may also include a number of user computers 306. The user computers are coupled to the data communication network 302 and may be operated by insurance company employees and/or independent agents to interact via the data communication network 302 with the insurance policy pricing server 304. For example, the user computers 306 may be used to input to the insurance policy pricing server 304 information concerning buildings or other objects proposed to be insured by the insurance company. The information input from the user computers 306 to the insurance policy pricing server 304 may identify the properties to be insured and may indicate characteristics of the properties, including characteristics that may cause the cost of replacement and/or repair of the properties to be sensitive to changes in one or more commodity prices.

In addition, the computer system 200 may include a hedging server computer 308. The hedging server computer 308 is coupled to the data communication network 302 and may operate in accordance with aspects of the present invention. The hedging model referred to in connection with FIG. 2 may be stored and applied in the hedging server computer 308 for the purposes of aiding the insurance company in hedging its exposure to price changes in one or more commodities.

A commodity futures market price information feed 310 is shown in phantom in FIG. 3 and may be accessible to the insurance policy pricing server 304 and the hedging server computer 308 via the data communication network 302. The information feed 310 may supply current price information from one or more commodity futures markets.

Also shown in phantom in FIG. 3 is a derivatives order destination 312. The derivatives order destination 312 may be an exchange, broker, market or other destination for commodity futures transaction orders dispatched by the hedging server computer 308 via the data communication network 302.

Figure 4:
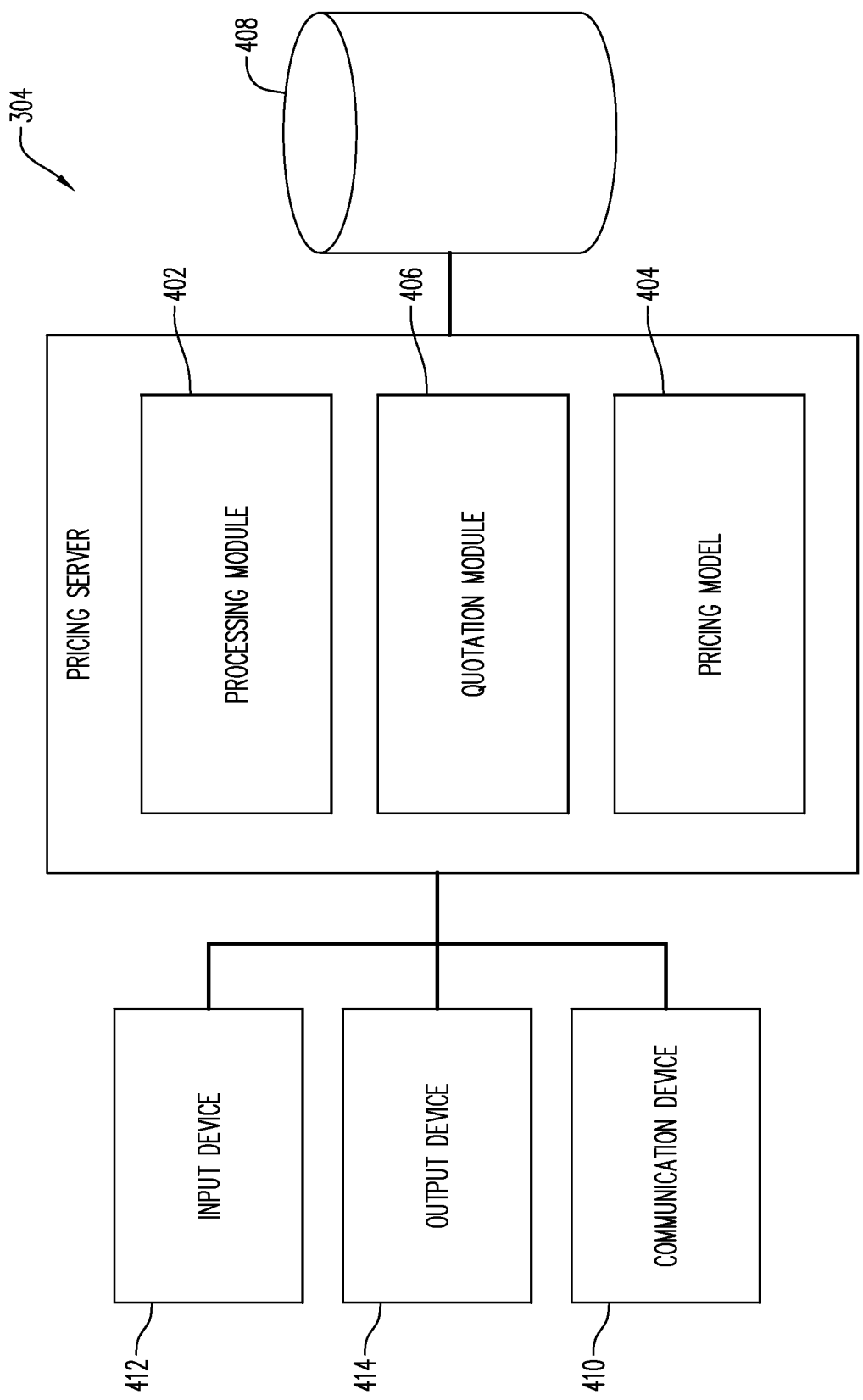
FIGS. 4 and 5 are block diagrams that illustrate server computers that are part of the computer system as illustrated in FIG. 3.

FIG. 4 is a block diagram representation of the insurance policy pricing server 304. The insurance policy pricing server 304 may be conventional in terms of its hardware aspects.

As depicted in FIG. 4, the insurance policy pricing server 304 includes a processing module 402, which may be constituted by one or more conventional computer processors. The insurance policy pricing server 304 may also incorporate a pricing model 404. The pricing model 404 may correspond to the pricing model referred to above in connection with the pricing model component 202 shown in FIG. 2. The pricing model 404 may be similar to conventional models for pricing insurance policies and/or generating insurance premium quotations, except that the pricing model 404 shown in FIG. 4 is augmented such that it also takes into consideration one or more constituent materials or components of the property to be insured, while also considering current and/or indicated future pricing of one or more commodities that are, or constitute a feedstock for, the constituent materials or components of the property to be insured. The pricing model 404 may be implemented at least in part in conjunction with the processing module 402.

The insurance policy pricing server 304 further includes a quotation module 406, which generates premium quotations for proposed insurance policies on the basis of the pricing model 404. The quotation module 406 may be constituted, at least in part, by the processing module 402 in combination with suitable software program instructions. Aspects of the software program instructions for the quotation module 406 will be described below.

Still further, the insurance policy pricing server 304 includes one or more storage devices, represented by item 408 in FIG. 4. The storage devices 408 are coupled for data communication with the processing module 402 and may comprise any appropriate information storage device, including combinations of magnetic storage devices (e.g., magnetic tape and hard disk drives), optical storage devices, and/or semiconductor memory devices (such as Random Access Memory (RAM) devices and Read Only Memory (ROM) devices). At least some of these devices may be considered computer-readable storage media, or may include such media. The storage devices 408 may store the above-mentioned software program instructions and/or other program instructions to control the processing module 402 such that the insurance policy pricing server 304 provides desired functionality, as described herein. Thus, the storage devices 408 store one or more programs for controlling the processing module 402. The processing module 402 performs instructions of the programs, and thereby operates in accordance with aspects of the present invention. In some embodiments, the programs may include one or more conventional operating systems. The programs may further include application programs such as a conventional data communication program and a conventional database management program. The programs stored in the storage devices 408 may also include conventional web hosting software. In addition, some or all of the pricing model 404 may be stored in the storage devices 408.

Continuing to refer to FIG. 4, the insurance policy pricing server 304 may further include one or more communication devices 410 coupled to the processing module 402. The communication devices 410 may function to facilitate communication with, for example, other devices (such as the user computers 306—FIG. 3, or the commodity futures market price information feed 310). In addition, the insurance policy pricing server 304 may include one or more input devices 412 such as a keyboard, a keypad, a mouse or other pointing device, a microphone, knob or a switch, an infra-red (IR) port, a docking station and/or a touch screen. The input device(s) 412 may be coupled to the processing module 402. Still further the insurance policy pricing server 304 may include one or more output devices 414, such as a display (e.g., a display screen), a speaker, and/or a printer. The output devices 414 may also be coupled to the processing module 402.

Figure 5:
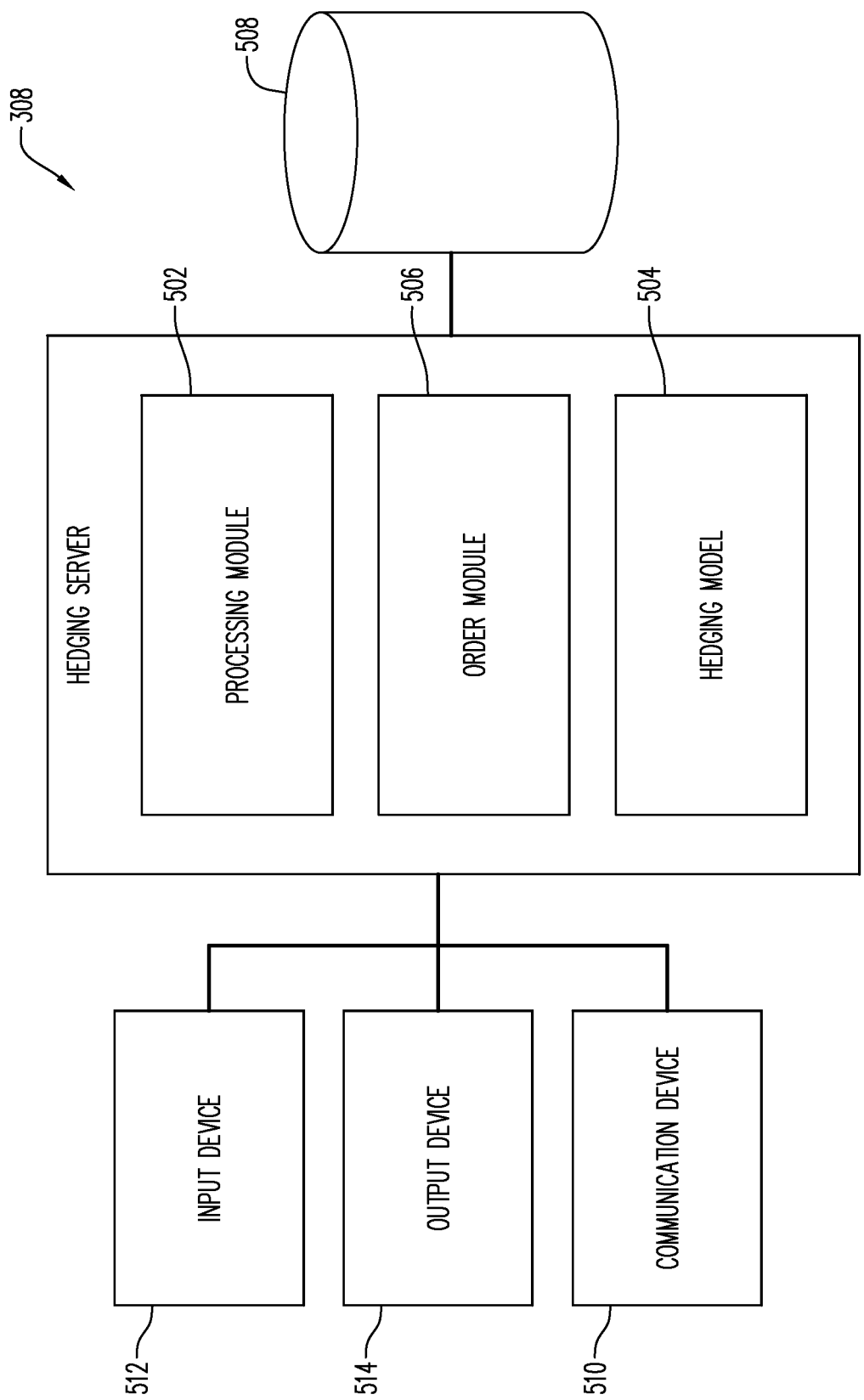

FIG. 5 is a block diagram representation of the hedging server computer 308. The hedging server computer 308 may be conventional in terms of its hardware aspects.

As depicted in FIG. 5, the hedging server computer 308 includes a processing module 502, which may be constituted by one or more conventional computer processors. The hedging server computer 308 may also incorporate a hedging model 504. The hedging model 504 may correspond to the hedging model referred to above in connection with the hedging model component 212 shown in FIG. 2. The hedging model 504 may generate one or more commodity futures transaction orders, based at least in part on aggregate characteristics of a class of properties insured or projected to be insured by the insurance company. Further details of the hedging model will be described below. The hedging model 504 may be implemented at least in part in conjunction with the processing module 502.

The hedging server computer 308 further includes an order module 506, which places the transaction orders as determined by the hedging model 504. The order module 506 may be constituted, at least in part, by the processing module 502 in combination with suitable software program instructions. Aspects of the software program instructions for the order module 506 will be described below.

Still further, the hedging server computer 308 includes one or more storage devices, represented by item 508 in FIG. 5. The storage devices 508 are coupled for data communication with the processing module 502 and may comprise any appropriate information storage device, including combinations of magnetic storage devices (e.g., magnetic tape and hard disk drives), optical storage devices, and/or semiconductor memory devices (such as Random Access Memory (RAM) devices and Read Only Memory (ROM) devices). At least some of these devices may be considered computer-readable storage media, or may include such media. The storage devices 508 may store the above-mentioned software program instructions and/or other program instructions to control the processing module 502 such that the hedging server computer 308 provides desired functionality, as described herein. Thus, the storage devices 508 store one or more programs for controlling the processing module 502. The processing module 502 performs instructions of the programs, and thereby operates in accordance with aspects of the present invention. In some embodiments, the programs may include one or more conventional operating systems. The programs may further include application programs such as a conventional data communication program and a conventional database management program. In addition, some or all of the hedging model 504 may be stored in the storage devices 508.

Continuing to refer to FIG. 5, the hedging server computer 308 may further include one or more communication devices 510 coupled to the processing module 502. The communication devices 510 may function to facilitate communication with, for example, other devices (such as the derivatives order destination 312—FIG. 3). In addition, the hedging server computer 308 may include one or more input devices 512 such as a keyboard, a keypad, a mouse or other pointing device, a microphone, knob or a switch, an infra-red (IR) port, a docking station and/or a touch screen. The input device(s) 512 may be coupled to the processing module 502. Still further the hedging server computer 308 may include one or more output devices 514, such as a display (e.g., a display screen), a speaker, and/or a printer. The output devices 514 may also be coupled to the processing module 502.

Figure 6:
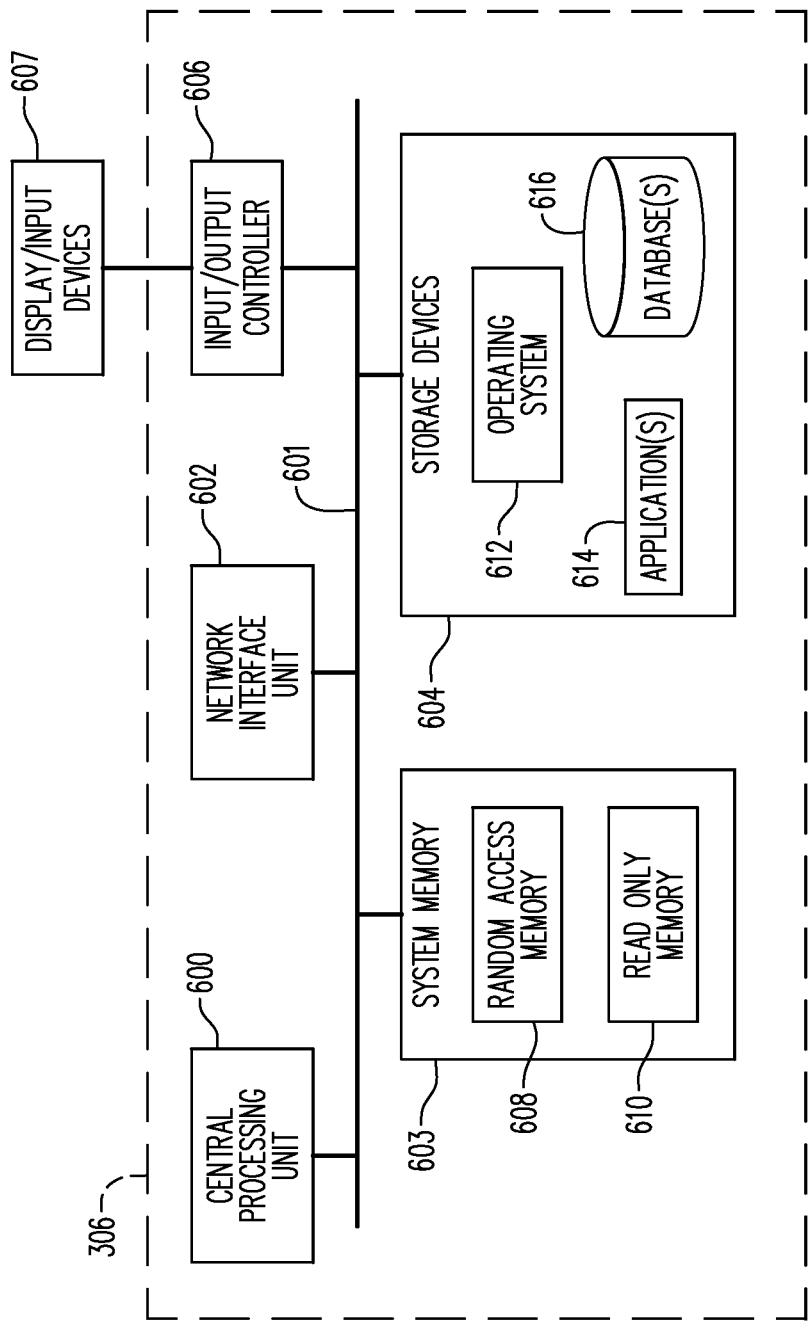
FIG. 6 is a block diagram of a typical one of the user computers shown in FIG. 3.

FIG. 6 is a block diagram representation of a typical one of the user computers 306 shown in FIG. 3. The user computer 306 may be conventional in terms of its hardware aspects.

As depicted in FIG. 6, the user computer 306 includes a data bus 601. The user computer 306 also includes a computer processor (CPU) 600 which is operatively coupled to the data bus 601 and which may be constituted by one or more conventional processors. The user computer 306 further includes a network interface unit 602, system memory 603, one or more storage devices 604, and an input/output controller 606, all of which are also operatively coupled to the data bus 601.

The network interface unit 602 may function to facilitate communication with, for example, other devices (such as the insurance policy pricing server 304). The input/output controller 606 may couple the user computer 306 to input and output devices (not shown) such as a keyboard, a keypad, a mouse or other pointing device, a microphone, knob or a switch, an infra-red (IR) port, a docking station, a touch screen, a display (e.g., a display screen), a speaker, and/or a printer. The display and/or input devices are represented by block 607 and may, e.g., include a flat panel display or other display device for presenting screen displays to the user of the user computer 306.

The system memory 603 may be constituted by, for example, a suitable combination of Random Access Memory (RAM) devices 608 and Read Only Memory (ROM) devices 610.

Storage devices 604 may comprise any appropriate information storage device, including combinations of magnetic storage devices (e.g., magnetic tape and hard disk drives), optical storage devices, and/or semiconductor memory devices. At least some of these devices (and/or all or part of the system memory 603) may be considered computer-readable storage media, or may include such media.

Storage devices 604 store one or more programs (at least some of which being indicated by blocks 612, 614) for controlling CPU 600. CPU 600 performs instructions of the programs, and thereby operates in accordance with aspects of the present invention. In some embodiments, the programs may include one or more conventional operating systems, indicated by block 614 in FIG. 6. The programs may further include application programs (block 612) such as a conventional data communication program and a conventional database management program. The application programs 612 may, for example, include a conventional electronic mail program and a conventional browser.

There may also be stored in the storage devices 604 other software, such as device drivers, etc.

Still further, the storage devices 604 may store one or more databases (block 616) for storing and managing the data relating to operation of the user computer 306.

Figure 7:
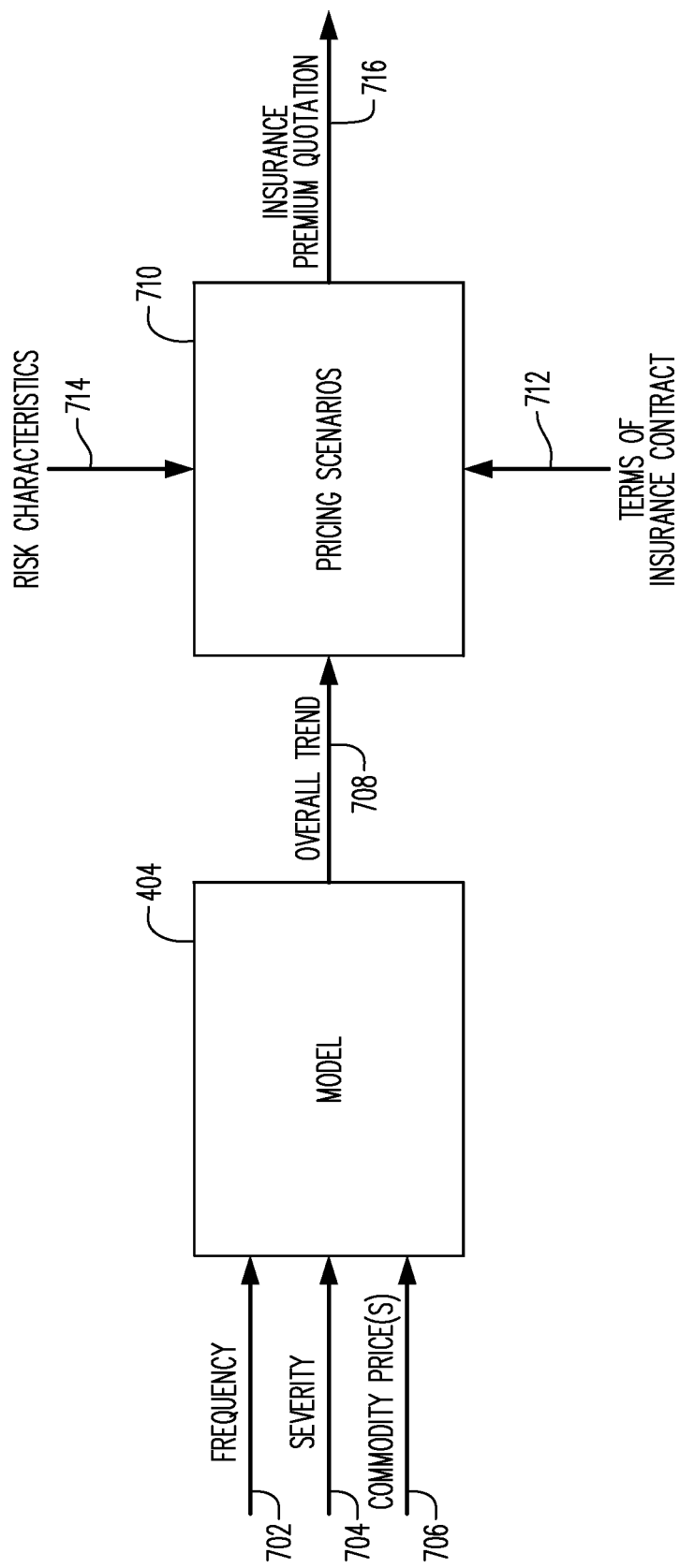
FIG. 7 illustrates data flows that may occur in the system of FIG. 2 or 3.

FIG. 7 illustrates data flows that may occur in the computer system 200. For example, the data flows shown in FIG. 7 may be implemented in the insurance policy pricing server 304 and the hedging server computer 308.

Block 404 is again shown in FIG. 7 as the pricing model referred to above in connection with FIG. 4. Inputs to the pricing model 404 may include data (reference numeral 702) that represents trends and/or forecasts relating to the frequency of claims for a particular class of properties to be insured. Another input to the pricing model is data (reference numeral 704) that represents trends and/or forecasts of the severity of claims for that class of properties. A further input to the pricing model 404 is data (reference numeral 706) relating to the price of one or more commodities implicated in the repair or replacement of the class of properties.

To give some more specific examples, the class of properties in question may be residential structures, and the commodities in question may, for example, include lumber futures in the case of structures that are of wood frame construction. Another relevant commodity may be oil futures, which is implicated for structures having asphalt tile roofs, because oil is a feedstock for the manufacture of asphalt roofing tiles.

In another example, the class of properties may be structures that are based on steel structural elements, and the relevant commodity may be steel futures.

As another example, the class of properties may be hybrid and/or electric motor vehicles, and the relevant commodity may be one or more rare earth elements that are constituent materials for the electrical power storage batteries that are key components in such vehicles. Steel futures may also be a relevant commodity for at least some classes of motor vehicles, including for example trucks constructed with sheet metal cargo-carrying bodies.

As indicated at 708, the pricing model 404 outputs a composite figure that represents the overall trend of claim costs, reflecting both expected frequency and severity of claims, and in accordance with aspects of the invention, the expected severity reflects the expected effect of changes in commodity prices on the costs of replacing or repairing insured structures or items.

In some embodiments, the overall trend figure may be calculated according to the following formula:

$$T_O = T_F * T_S * D,$$

where:

T_O is the overall trend;

T_F is the frequency trend;

T_S is the severity trend; and

D is a severity adjustment that reflects a price level or a futures contract price level of one or more commodities.

Block 710 represents pricing scenarios, which are applied to the overall trend information provided from the pricing model 404. Other inputs of the pricing scenarios 710 are the proposed terms of the insurance contract (reference numeral 712), and information 714 that indicates characteristics of the property to be insured. For example, if the insured property is a building, the risk characteristic information 714 may indicate the nature of the construction of the building and/or may indicate the materials of which the building is constructed.

The output 716 from the pricing scenarios 710 is an insurance premium quotation that reflects both the nature of the insured property and effects of expected commodities prices that are relevant to the anticipated cost of repairing or replacing the insured property.

Figure 8:
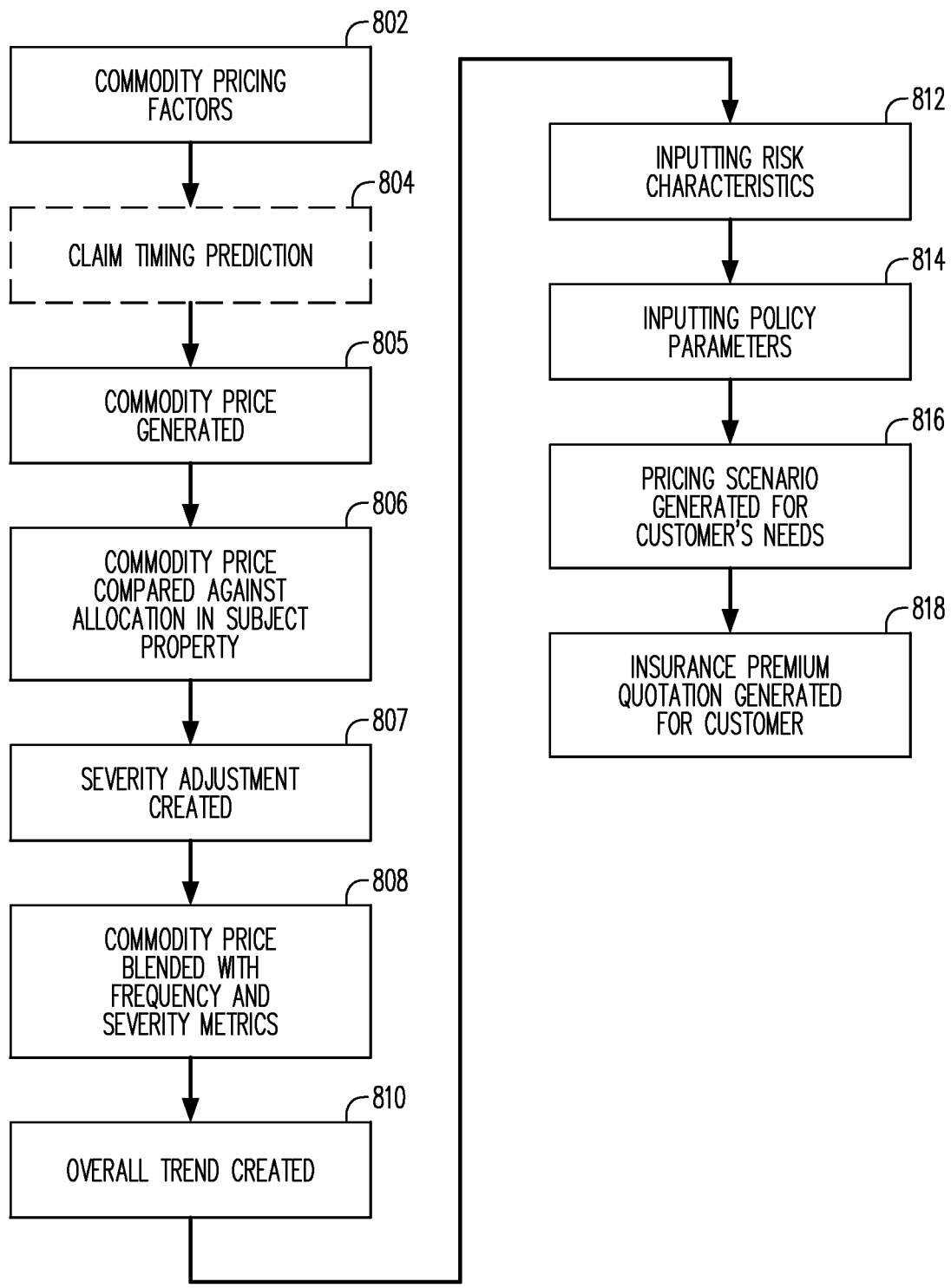
FIG. 8 is a flow chart that illustrates a process that may be performed in accordance with aspects of the invention in the system of FIG. 2 or 3.

FIG. 8 is a flow chart that illustrates a process that may be performed in accordance with aspects of the present invention in the computer system 200.

At 802, the insurance policy pricing server 304 receives a feed of commodity futures contract pricing information from one or more markets or exchanges and/or other sources of market information. The commodity futures contract pricing information may reflect current trading in commodity futures contracts with respect to commodities that are deemed relevant to one or more types of properties insured by the insurance company. As noted above, such commodities may include oil futures, lumber futures, steel futures, rare earth futures, etc.

At 804, the insurance policy pricing server 304 uses one or more models to predict the probable timing of potential claims for a particular proposed insurance policy. At 805, based on the predicted timing, the insurance policy pricing server 304 generates a commodity futures price for a relevant commodity for a point in time in the future that matches the predicted timing of the claim. This commodity price may be based on current market prices of various futures contracts for the commodity. For the purposes of the present example, it will be assumed that the property to be insured is a residential structure having a roof made of asphalt tiles, and that the relevant commodity is oil futures, because the price of oil affects the cost of manufacturing asphalt tiles, and thus affects the probable severity of a claim that involves repairing or replacing an asphalt tile roof.

Figure 8A:
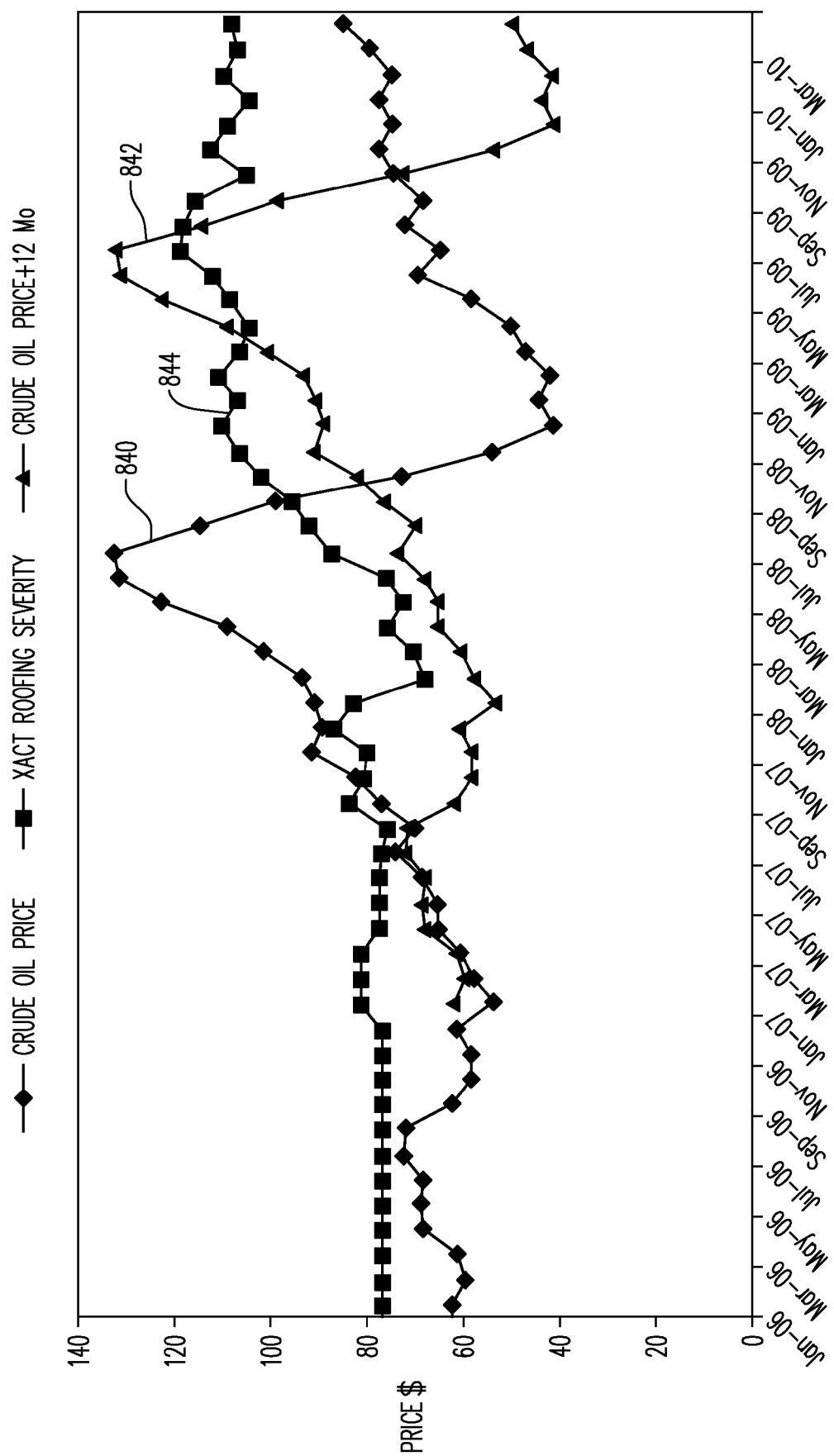
FIG. 8A graphically illustrates data that shows an example of how prices of building materials may be affected by changes in commodity prices.

FIG. 8A is a graph that shows a historical relationship between a change in oil prices and a change in the price of asphalt roofing tiles. Plot 840 in FIG. 8A indicates changes in oil prices over time. Plot 842 is the same as plot 840, but shifted 12 months into the future relative to plot 840. Plot 844 indicates changes in the price of asphalt roofing tiles over time.

The data graphed in FIG. 8A suggests that price trends in asphalt roofing tiles tend to follow trends in oil prices, with a lag of about 12 months.

Figure 8B:
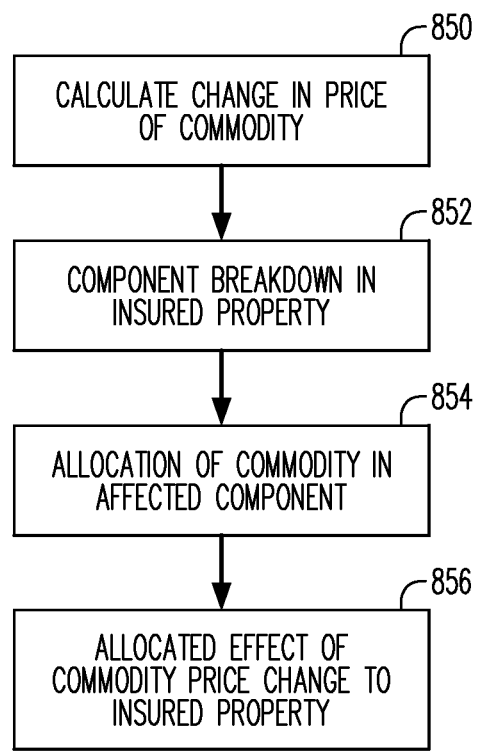
FIG. 8B is a flow chart that illustrates some details of the process of FIG. 8.

Referring again to FIG. 8, at blocks 806 and 807, the price of the commodity is compared against its allocation in the property to be insured, and a severity adjustment is calculated accordingly. FIG. 8B illustrates in flow chart form some details of these steps.

Referring to FIG. 8B, at 850 a change in price factor for the commodity is calculated based on the commodity price generated at 805. This may be done according to the formula $$C=(x-y)/y$$

where:

C is the price change factor;

y is the price before the change; and x is the price after the change (current price if pulled mid month alternatively).

At 852, the property to be insured is analyzed in terms of its components that may be sensitive to commodity pricing. For example, in the case of a building with an asphalt tile roof, the proportion of the building's replacement cost allocable to the roof is determined.

At 854, a determination is made as to the proportion of the affected component's replacement cost that is attributable to the implicated commodity.

At 856, based on the previous steps, the allocable effect of the commodity price change on the entire property replacement cost is calculated as the severity adjustment that was referred to above.

With the effect of steps 802-807 and 850-856, the severity adjustment is applied in the pricing model, thereby producing a premium price calculation (at 808, FIG. 8) that includes a commodity price as an input to a pricing model that also considers probable frequency and severity of claims in generating an overall claims cost trend, as indicated at 810 in FIG. 8.

Figure 9:
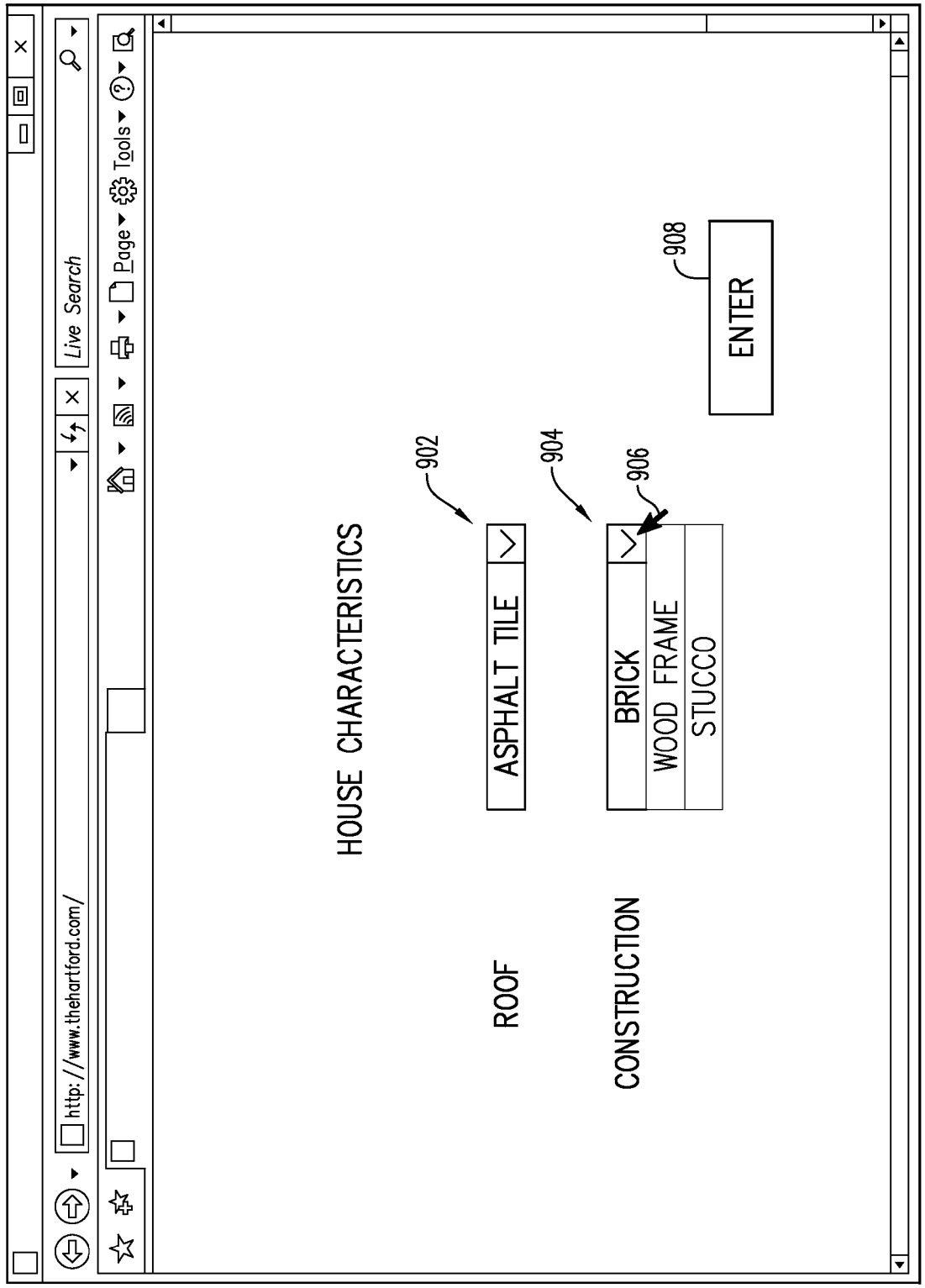
FIGS. 9 and 10 are screen displays that may be provided by the computer system in conjunction with the process of FIG. 8.

At 812, a user of the computer system 200 inputs at least one characteristic of the property to the insurance policy pricing server 304. This may occur for example by the user operating a user computer 306 that interacts with the insurance policy pricing server 304. FIG. 9 is an example screen display that may be downloaded from the insurance policy pricing server 304 to a user computer 306 for display on the display device 607 (FIG. 6) of the computer 306. As seen from FIG. 9, the screen display may include a drop-down menu 902 that allows the user of the user computer 306 indicate the type of roof that is present on the structure to be insured. In this particular example, the user has indicated that the structure has a roof made of asphalt tile.

Also seen in the screen display of FIG. 9 is another drop-down menu 904, by which the user may indicate an overall type of construction for the structure that is to be insured. In this example screen display, the user is currently interacting with the drop-down menu 904 by using the cursor 906. Once the user has completed selecting menu options from the drop-down menus 902 and 904, the user may indicate that his/her entry of information on the screen display is complete by actuating the "enter" button indicated at 908 in the screen display. Upon actuation of the enter button 908, the insurance policy pricing server 304 may, at least in some cases, download one or more other screen displays (not shown) to the user computer 306 to solicit additional information from the user concerning characteristics of the property to be insured. For example, in this case a further screen display, which is not shown, may be presented to the user so that the user may enter the area taken up by the "footprint" of the structure to be insured. From this information, the insurance policy pricing server 304 may calculate the size of the asphalt tile roof and may go on to calculate the probable cost of repairing or replacing the roof, based in part on the oil futures price determined at 806.

At 814, and via one or more screen displays that are not shown, the user may input to the computer system 200 one or more parameters for the proposed insurance policy. For example, the policy parameters may include the amount of a deductible, the term of the policy, etc.

Figure 10:
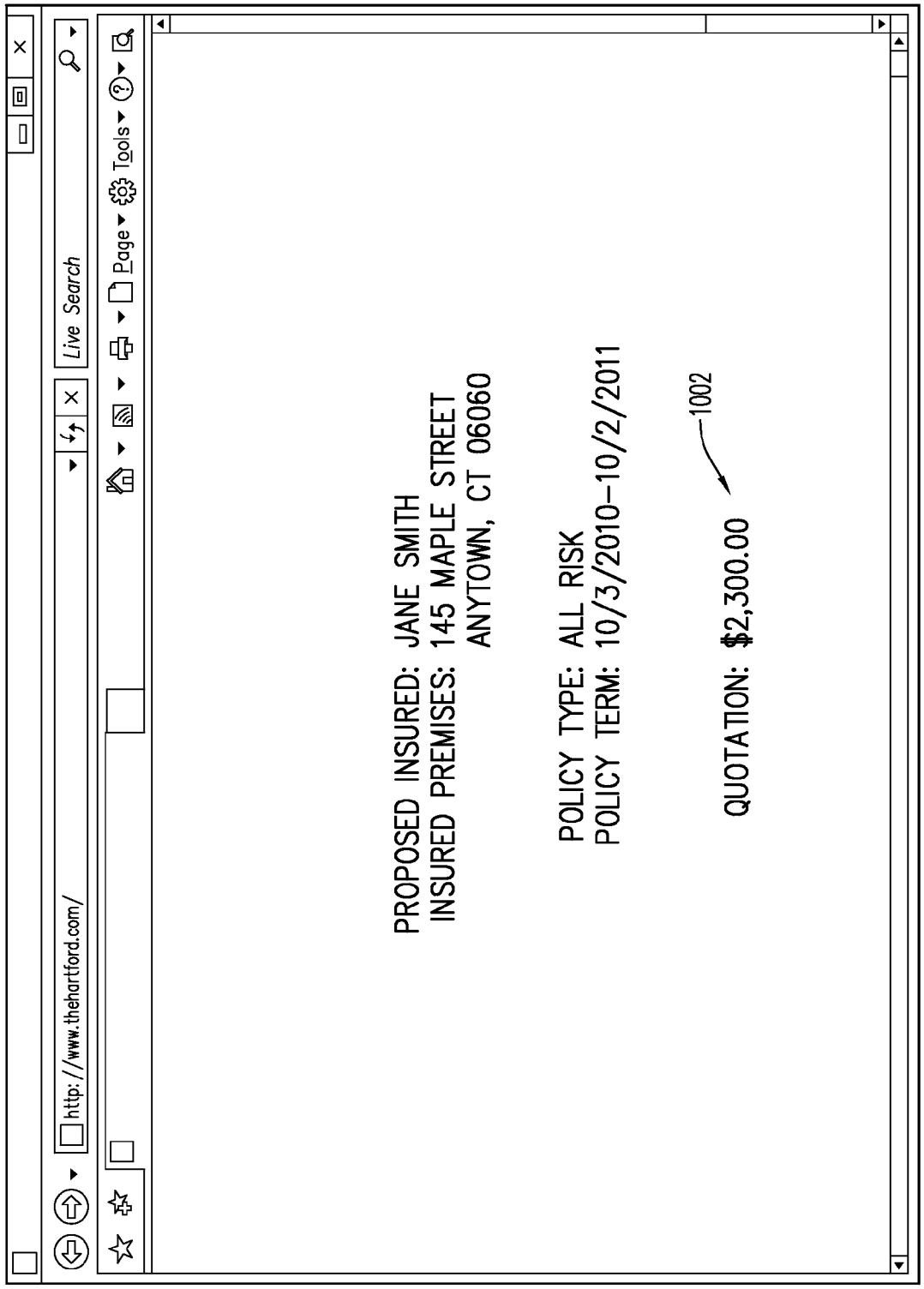

At 816, the insurance policy pricing server 304 may generate a pricing scenario for the proposed insured based on the characteristics of the property and the policy parameters as entered at 812 and 814. Based on the pricing scenario, the insurance policy pricing server 304 generates and outputs an insurance premium quotation for the proposed insurance policy, as indicated at 818 in FIG. 8. FIG. 10 is an example screen display that may be downloaded from the insurance policy pricing server 304 for display on the display device 607 of the user computer 306. The insurance premium quotation generated by the insurance policy pricing server 304 according to the example is shown at 1002 in the screen display of FIG. 10.

By taking relevant commodity futures pricing into account in generating insurance policy pricing, the insurance company may more accurately match its pricing to its probable exposure for the risks it assumes. Consequently, the insurance company may set its prices more competitively where commodity futures prices suggest a lower exposure than would be expected without taking commodity prices into consideration. On the other hand, where commodity prices suggest a higher exposure than indicated by conventional frequency and severity trends alone, the insurance company's policy pricing may more fully compensate the company for the risks undertaken.

Figure 11:
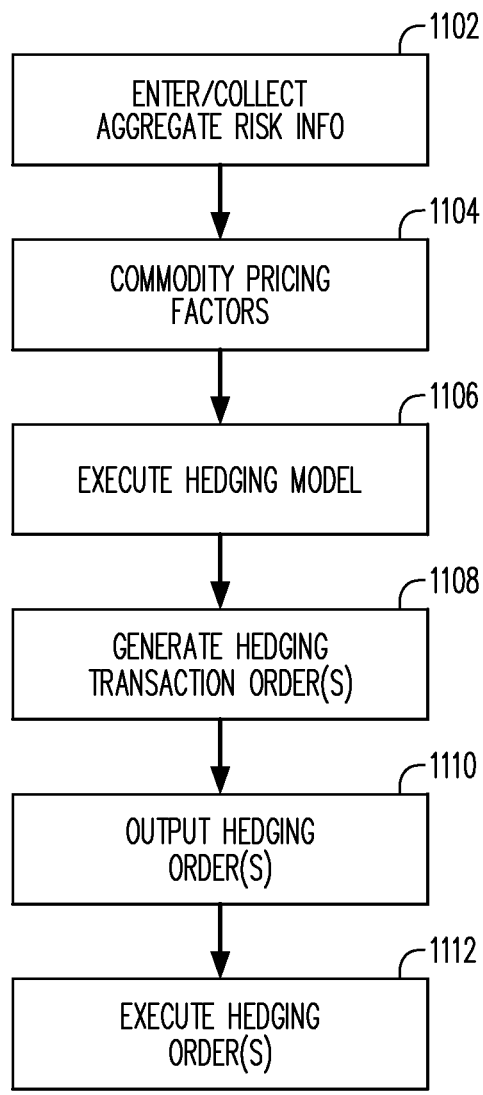
FIG. 11 is a flow chart that illustrates another process that may be performed in accordance with aspects of the invention in the system of FIG. 2 or 3.

FIG. 11 is a flow chart that illustrates another process that may be performed in accordance with aspects of the invention in the computer system 200. FIG. 11 illustrates another way in which an insurance company may consider commodity futures in relation to its assumption of risks.

At 1102 in FIG. 11, a user of the computer system 200 may enter and/or gather data that reflects a class of properties insured by the insurance company. This gathering/inputting of information may occur, for example, via interaction between a user computer 306 operated by the user and the hedging server computer 308. For purposes of this example it is assumed that the class of properties to be considered consists of wood-frame buildings projected to be insured by the insurance company. Accordingly, the information provided to the hedging server computer 308 may include the total number of wood frame structures that it is projected that the insurance company will insure over the next year, and also the average size of the wood frame structures.

At 1104 in FIG. 11, the hedging server computer 308 receives commodity futures pricing information related to one or more relevant commodities. In this example, it is assumed that the relevant commodity is lumber futures, which are relevant to the insurance company's potential exposure for insuring the wood frame structures.

At 1106, the hedging model stored in the hedging server computer 308 is executed, based on the aggregate risk characteristic information input at 1102 and the commodity price information input at 1104. At 1108 the hedging model generates one or more hedging transaction orders intended to hedge the insurance company's exposure to repair or replacement costs for the projected population of wood frame structures to be insured by the insurance company. For example, the hedging transaction orders may have the effect of locking in future prices of lumber, so that the insurance company would not suffer enhanced claim losses due to price increases if a natural disaster occurring in the future were to drive up lumber prices.

Figure 12:
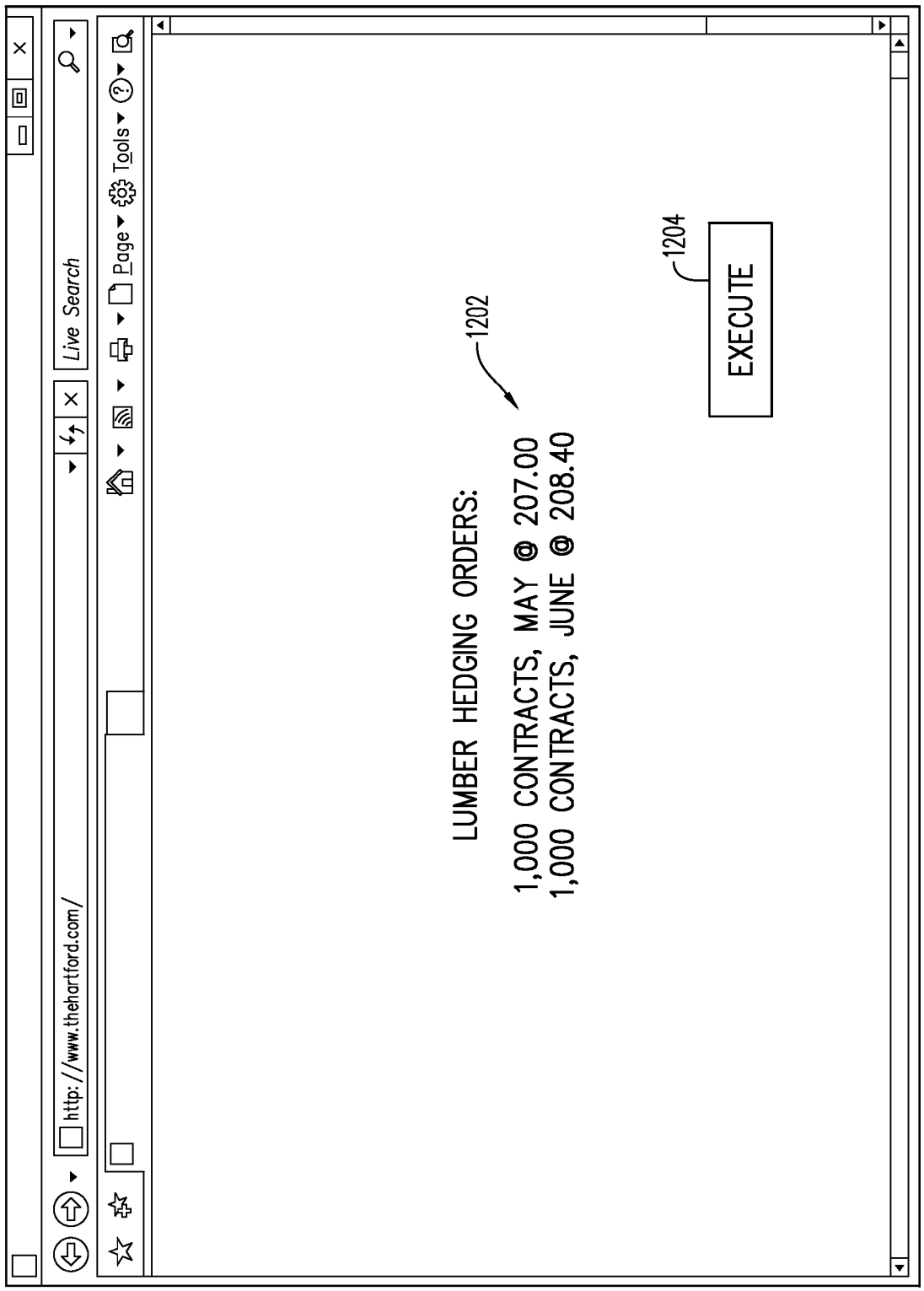
FIG. 12 is a screen display that may be provided by the computer system in conjunction with the process of FIG. 11.

At 1110, the hedging server computer 308 may output proposed hedging transaction orders for review and approval by a user of the computer system 200. FIG. 12 is an example screen display that may be provided by the computer system 200 in connection with step 1110. For example, the screen display of FIG. 12 may be downloaded by the hedging server computer 308 for display by a display device 607 that is part of a user computer 306.

It will be appreciated that the hedging transactions may include purchasing of commodity futures contracts. In FIG. 12, proposed hedging transaction orders are listed at 1202. The user may approve and initiate execution of the hedging transaction orders by actuating the "execute" button shown at 1204. When this occurs, the hedging server computer 308 may dispatch the hedging transaction orders for execution (step 1112, FIG. 11). For example, the hedging server computer 308 may send the hedging transaction orders to a broker employed by the insurance company, or directly to a market or exchange for execution.

In some embodiments, the property to be insured may be livestock, and the hedging and/or pricing operations described herein may be based on commodity futures relevant to the type of livestock to be insured.

In some embodiments, changes in commodity prices may be taken into consideration in pricing premiums for renewal insurance policies.

Pricing of commodity futures contracts, and hedging operations with such contracts, have been referred to above. In addition or alternatively, the pricing calculations and hedging as described herein may be based on suitable options contracts. Accordingly, where the term "futures" appears in the appended claims, that term should also be understood to encompass options.

The insights provided by commodities prices—in accordance with principles of this invention—relative to policy premium pricing and hedging of an insurance company's aggregate exposure may also be applied to the insurance company's activities in managing vendors, such as vendors of building supplies.

Processes portrayed herein as being performed by one computer may in practice be divided among two or more computers. Processes portrayed herein as being performed by two or more computers may in practice be performed by a single computer. For example, the insurance policy pricing server 304 and the hedging server computer 308 may be integrated together as a single computer.

The process descriptions and flow charts contained herein should not be considered to imply a fixed order for performing process steps. Rather, process steps may be performed in any order that is practicable.

As used herein and in the appended claims, the term "computer" refers to a single computer or to two or more computers in communication with each other and/or operated by a single organization or by two or more organizations that are partly or entirely under common ownership and/or control.

As used herein and in the appended claims, the term "processor" refers to one processor or two or more processors that are in communication with each other.

As used herein and in the appended claims, the term "memory" refers to one, two or more memory and/or data storage devices.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer implemented insurance pricing method for generating a premium quotation for a proposed insurance policy for a property, comprising:
   receiving, in a computer, information identifying said property, the information including information indicative of a sensitivity of at least one constituent material of said property to a price of a commodity;
   receiving, in said computer, commodities futures information associated with a futures contract price for said commodity;
   applying, by said computer, an insurance pricing model, said insurance pricing model operating on said information indicative of a sensitivity of at least one constituent material of said property to a price of a commodity and said commodities futures information to generate a premium quotation for insuring said property, wherein said premium quotation is a function of said futures contract price, said applying comprising: determining a severity adjustment based on a change in price factor for the commodity, a proportion of a replacement cost of said property allocable to a component of the property sensitive to the commodity, and a proportion of a replacement cost of the component attributable to the commodity; and determining an overall trend of claim costs figure based on a frequency of claims trend, a severity of claims trend and the determined severity adjustment; and
   operating said computer to output said premium quotation for said proposed insurance policy for said property.

2. The computer implemented method of claim 1, wherein said property is a building, and the at least one constituent material of said building is at least one of (i) wood, (ii) asphalt, (iii) concrete, (iv) shingles, and (v) metal.

3. The computer implemented method of claim 1, wherein said property is a motor vehicle.

4. The computer implemented method of claim 1, wherein said property is a type of livestock.

5. The computer implemented method of claim 1, further comprising:
   predicting, by said computer, a probable timing of potential claims under said proposed insurance policy on said property.

6. The computer implemented method of claim 1, wherein the at least one commodity includes at least one of oil, wood and steel.

7. The computer implemented method of claim 1, further comprising:
   issuing an insurance policy in accordance with the premium quotation.

8. The computer implemented method of claim 1, wherein said property is one of a class of properties insured by an insurance company, said class of properties associated with said at least one constituent material, the method further comprising:
   receiving, in a computer, information indicative of an aggregate sensitivity of said class of properties to a price of said commodity; and
   operating, in a computer, a hedging model to determine one or more commodity transactions for hedging the insurance company's exposure to changes in said price of said commodity across said class of properties.

9. The computer implemented method of claim 8, further comprising:
   operating a computer to generate one or more orders to execute said one or more commodity transactions; and
   outputting said one or more orders.

10. The computer implemented method of claim 9, wherein said one or more orders include at least one purchase of a commodity futures contract.

11. A computer system, comprising:
   a processor; and
   a memory in communication with the processor and storing program instructions, the processor operative with the program instructions to:
      receive information identifying a property to be insured, the information including information indicative of a sensitivity of at least one constituent material of said property to a price of a commodity;
   receive commodities futures information associated with a futures contract price for said commodity;
   apply an insurance pricing model, said insurance pricing model operating on said information indicative of a sensitivity of at least one constituent material of said property to a price of a commodity and said commodities futures information to generate a premium quotation for insuring said property, wherein said premium quotation is a function of said futures contract price, said applying comprising: determining a severity adjustment based on a change in a price factor for the commodity, a proportion of a replacement cost of the property allocable to a component of the property sensitive to the commodity, and a proportion of a replacement cost of the component attributable to the commodity; and determining an overall trend of claim costs figure based on a frequency of claims trend, a severity of claims trend and the determined severity adjustment; and
   operate said computer to output said premium quotation for said proposed insurance policy for said property.

12. The computer system of claim 11, wherein said property is one of a class of properties insured by an insurance company, said class of properties associated with said at least one constituent material, the processor further operative with the program instructions to:
   receive information indicative of an aggregate sensitivity of said class of properties to a price of said commodity; and
   execute a hedging model to determine one or more commodity transactions for hedging the insurance company's exposure to changes in said price of said commodity across said class of properties.

13. The computer system of claim 12, the processor further operative with the program instructions to:
   generate one or more orders to execute said one or more commodity transactions; and
   output said one or more orders.

14. The computer system of claim 11, wherein said property is at least one of a building, livestock, and a vehicle.

15. The computer system of claim 11, wherein the insurance pricing model predicts a probable timing of potential claims under a proposed insurance policy on said property.

16. The computer system of claim 11, wherein the at least one constituent material includes at least one of oil, wood and steel.

17. A computer system comprising:
   an information input component configured to input information identify a property to be insured, the information indicative of a sensitivity of at least one constituent material of said property to a price of a commodity;
   a commodities market information input component configured to receive commodity futures information associated with a futures contract price for said commodity;
   a pricing model component configured to store an insurance pricing model, the insurance pricing model operative on said information indicative of a sensitivity of at least one constituent material of said property to a price of a commodity and said commodities futures information to generate a premium quotation for insuring said property, wherein said premium quotation is a function of said futures contract price, the insurance pricing model further configured to: determine a severity adjustment based on a change in price factor for the commodity, a proportion of a replacement cost of said property allocable to a component of the property sensitive to the commodity, and a proportion of a replacement cost of the component attributable to the commodity; and determine an overall trend of claim costs figure based on a frequency of claims trend, a severity of claims trend and the determined severity adjustment; and an output module coupled to the processor and configured to output said premium quotation.

18. The computer system of claim 17, wherein said property is one of a class of properties insured by an insurance company, said class of properties associated with said at least one constituent material, the system further comprising:

a hedging input module configured to receive information indicative of an aggregate sensitivity of said class of properties to a price of said commodity; and a hedging model operable to determine one or more commodity transactions for hedging the insurance company's exposure to changes in said price of said commodity across said class of properties.

19. The computer system of claim 18, further comprising:
a hedging transaction module to generate one or more orders to execute said one or more commodity transactions and to cause the output of said one or more orders.

20. The computer system of claim 17, wherein said property is at least one of a building, livestock, and a vehicle.

21. The computer system of claim 17, wherein the insurance pricing model predicts a probable timing of potential claims under a proposed insurance policy on said property.

22. The computer system of claim 17, wherein the at least one constituent material includes at least one of oil, wood and steel.

* * * * *

UNITED STATES PATENT AND TRADEMARK OFFICE
CERTIFICATE OF CORRECTION

PATENT NO. : 8,630,880 B2  Page 1 of 1
APPLICATION NO. : 13/716543
DATED : January 14, 2014
INVENTOR(S) : Nicholas Ryan Munger It is certified that error appears in the above-identified patent and that said Letters Patent is hereby corrected as shown below:

On the Title page, Item (54) and in the Specification, Column 1, the seventh word of the title should be spelled --Calculation--.

Signed and Sealed this
Eighteenth Day of March, 2014

Michelle K. Lee
*Deputy Director of the United States Patent and Trademark Office*